A. E. Beach.
Pneumatic Railway.
Nº 64,402.    Patented May 7, 1867.
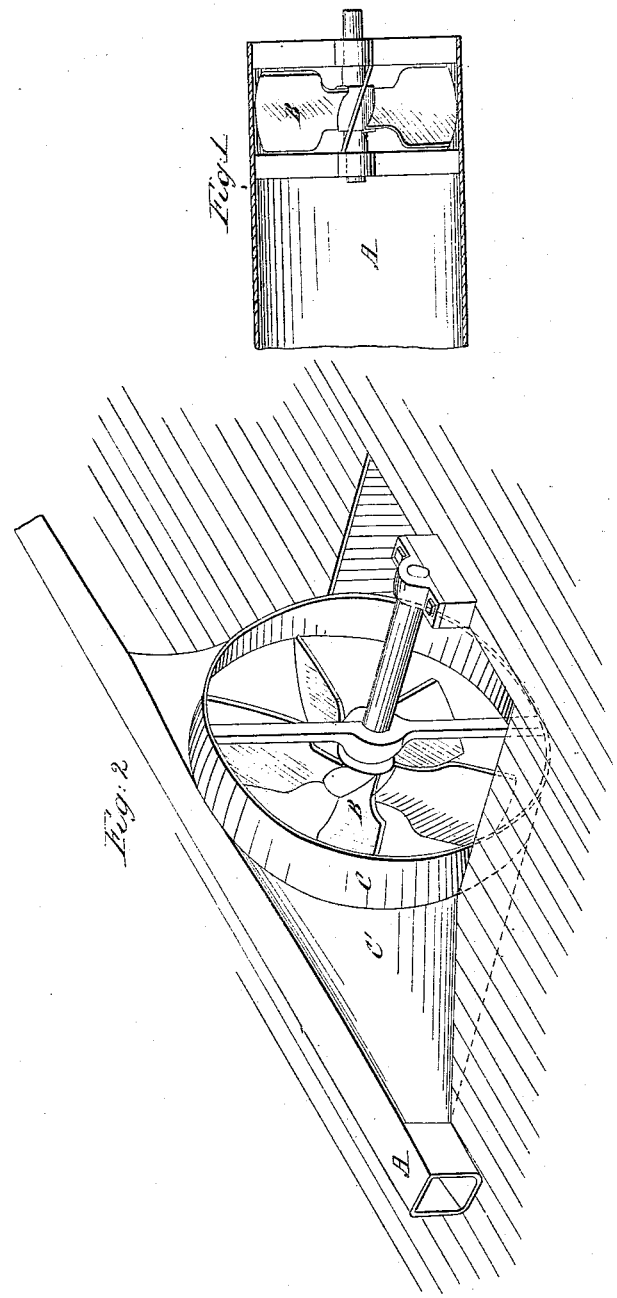
Witnesses.
Wm Freuun
Wm. F. McNamara
Inventor
A. Ely Beach

United States Patent Office.

A. ELY BEACH, OF STRATFORD, CONNECTICUT.

Letters Patent No. 64,402, dated May 7, 1867.

IMPROVEMENT IN PNEUMATIC RAILWAYS.

The Schedule referred to in these Letters Patent and making part of the same.

TO ALL WHOM IT MAY CONCERN:

Be it known that I, A. ELY BEACH, of Stratford, Fairfield county, State of Connecticut, have invented a new and useful Improvement in Devices for Propelling Cars in Pneumatic Tubes, and other purposes; and I do hereby declare that the following is a clear and accurate description of my invention, sufficient to enable any person skilled in the art to make and use my said invention. Reference is to be made to the accompanying drawing, which forms a part of this specification, in which—

Figure 1 is a side sectional elevation of my improvement as applied to a pneumatic tube; and Figure 2 is a perspective view of my improvement as applied to a pneumatic tube.

A is a pneumatic tube, which may be of any of the known forms, in which tube the pneumatic cars run, being propelled therein by the pressure of the air, the latter being forced into the tube or exhausted therefrom by mechanical means or devices, which thus serve to cause the cars to move. My improvement relates to the devices thus employed to propel the cars.

In one end of the pneumatic tube I place and combine an air-wheel, B, which may have the form of a common windmill or a screw-propeller; and when rotary motion is imparted to the wheel B the air will be either driven into the tube A or exhausted therefrom, according to the direction in which the wheel B is driven, with a force and velocity corresponding to the velocity imparted to the wheel B. When an extremely rapid and strong exhaust or blast of air is required in the pneumatic tube I enlarge the wheel B, so that its diameter will exceed that of the pneumatic tube, and I place the wheel within a casing, C, the inner portion whereof, C', is made flaring, so as to communicate with the pneumatic tube, the area of the inner part of the flaring casing C', where it unites with the tube A, being equal to the area of the circular casing C.

I do not confine or limit myself to the use of any particular number of arms or blades for the wheel, nor to any particular angle at which they are set. I propose to employ such form for the wheel or propeller as may prove best suited for the production of the desired speed in the propulsion of the pneumatic cars. One or more wheels B may be employed in connection with the tube.

Having thus described my invention, I claim, and desire to secure by Letters Patent—

The employment of the within-described device, in combination with pneumatic tubes, substantially as set forth.

A. ELY BEACH.

Witnesses:
WM. TREWIN,
WM. F. McNAMARA.